United States Patent [19]

Grote et al.

[11] 4,344,515

[45] Aug. 17, 1982

[54] CLAW CLUTCH

[75] Inventors: Hugo Grote, Wetter; Heinz Hasselmann, Hagen; Volkmar Kunze, Wetter; Karl Zacharias, Schwerte; Robert Küelpmann; Paul Mueller, both of Wetter, all of Fed. Rep. of Germany

[73] Assignee: Mannesmann DeMag AG, Duisburg, Fed. Rep. of Germany

[21] Appl. No.: 136,665

[22] Filed: Apr. 2, 1980

[30] Foreign Application Priority Data

Apr. 4, 1979 [DE] Fed. Rep. of Germany ....... 2913483
Dec. 1, 1979 [DE] Fed. Rep. of Germany ....... 2948430
Dec. 1, 1979 [DE] Fed. Rep. of Germany ....... 2948431

[51] Int. Cl.³ .......................................... F16D 11/04
[52] U.S. Cl. ................................... 192/67 R; 464/66; 464/87
[58] Field of Search ................. 192/67 R; 64/9 A, 23, 64/23.7, 14; 403/274

[56] References Cited

U.S. PATENT DOCUMENTS

| 1,504,279 | 8/1924 | Spicer | 64/14 |
| 1,748,146 | 2/1930 | Ricefield | 64/9 A |
| 2,343,839 | 3/1944 | Austin | 64/14 |
| 3,638,454 | 2/1972 | Croset | 64/14 |
| 3,830,081 | 8/1974 | Weber et al. | 64/14 |

FOREIGN PATENT DOCUMENTS

| 848003 | 9/1952 | Fed. Rep. of Germany . |
| 849049 | 9/1952 | Fed. Rep. of Germany . |
| 879632 | 6/1953 | Fed. Rep. of Germany . |
| 1801606 | 11/1971 | Fed. Rep. of Germany . |
| 2418057 | 10/1975 | Fed. Rep. of Germany . |
| 2548803 | 5/1977 | Fed. Rep. of Germany . |
| 111807 | 12/1917 | United Kingdom | 64/14 |

OTHER PUBLICATIONS

"Transiflex" publication (date & author not apparent).

Primary Examiner—Rodney H. Bonck
Attorney, Agent, or Firm—Mandeville and Schweitzer

[57] ABSTRACT

The disclosure relates to a claw clutch mechanism, comprising opposing, interengaged clutch halves, each having axially projecting claws extending into the other. Cylindrical elastic bumpers are interposed between adjacent claws to absorb shock and accommodate axial displacement of the clutch halves. The clutch halves are of pressure cast aluminum construction, formed to provide large radius transitional fillets or roundings at the base of the claws, which correspond in radius to the contours of the cylindrical elastic bumpers. Integral reinforcing rings connect the angularly arrayed claws of each clutch half, both on the outside and the inside of the claws, to provide mechanical support for about half the length of the claw. The reinforcing rings also serve to confine the elastic bumpers, and may be provided with opposed flat surfaces at positions corresponding to bumper locations. The elastic bumpers, which advantageously are formed of a Polyamid plastic, may be connected by an integral bridge ring, accommodating limited torsional displacement of the individual bumper elements. Typically, all of the bumpers will be held in one clutch half, being retained therein by crescent shape spring levers carried by the claws of that clutch half.

22 Claims, 8 Drawing Figures

CLAW CLUTCH

The invention refers to a claw clutch with circumferentially distributed interengageable claws arranged at the fronts of the respective clutch halves, each projecting into the other clutch half, with elastic bumpers in the form of cylindrical roller elements positioned between adjacent interengaged claws. Such clutches permit shifting of the shafts of motor and gears.

A claw clutch of this type has been disclosed in German Patent Specification No. 25 48 803. The clutch halves are made of high quality steel by mechanical treatment due to their being subject to sudden stress. Therefore they are very expensive. In order to simplify assembly, the bumpers are connected by means of stays which impair, however, the rolling off of the bumpers in case of axial displacements of the clutch halves. Furthermore, the cylindrical bumpers have, on account of the casting mold joint, in the area of the contact surfaces a more or less pronounced ridge and often also a disturbance in the structure, also hindering the rolling off of the bumpers in case of axial displacement. Such axial displacement occurs when using the claw clutch with displacement rotor motors. The axial displacement of the displacement rotor is hindered by the irregular bumpers.

It is therefore the object of the invention to design an economical claw clutch whose clutch halves are completely uniformly displaceable in axial direction to one another. This is solved by manufacturing the clutch halves by pressure casting and by providing the claws of the clutch halves with roundings matching the contours of the bumpers. Due to the roundings of the claws no stress peaks occur at the claw base so that any considerations against the use of pressure casting in claw clutches placed under sudden stress are no longer justified. The use of pressure casting has the advantage that the parts of the claw clutch may be manufactured with all required projections and recessess with the necessary precision without any refinishing. Aluminum is suitable for pressure casting.

In a further development of the invention the claws in annular arrangement are, at approximately half their height, connected to each other via an outer retaining ring and an inner guide ring for the bumpers. Both rings also serve to reinforce the claws whose ends, projecting beyond the rings, are no longer under great stress. The rounding mentioned in connection with the rings cannot be manufactured with justifiable expenditure in the mechanical treatment used heretofore. The outer circumference of the guide ring and the inner surface of the retaining ring are provided with opposed, flat surfaces running parallel with the end surfaces of the bumpers.

The bumpers consist of cylindrical rollers whose axes are in stellar or radial arrangement around the clutch axis. In one modification, the invention bumpers are provided with guide cams projecting from the end surfaces of the bumpers coaxial with their axes such guide cams projecting into guide grooves formed in the outer retaining ring and the inner guide ring. The cylindrical rollers may be made of round bars or they may be pressed as individual parts; they have a uniform surface and a homogeneous structure and therefore roll off uniformly at the claws in case of axial displacement of the clutch halves. The guide cams facilitate a simple mounting and location of the bumpers in the clutch half during assembly. Preferably the bumpers consist of Polyamid or another elastic plastic or rubber.

In order to prevent the bumpers from slipping unintentionally from the respective clutch half, at least one of the cluch halves may be provided with recesses for receiving spring levers holding the bumpers. The recesses for the spring levers are arranged at a distance above the bumpers adhering to the roundings in order to allow for displacement in the direction of the clutch axis. One crescent-shaped spring lever each is held at one claw and projects with the rounded-off tip beyond the bumpers close by. The spring lever may be interrupted in the center at one of its long sides in order to simplify assembly.

Each clutch half is preferably provided with a central borehole with a spline groove to attach the clutch to a shaft by means of an adapter spring. The clutch halves may be provided, on the sides of the inner guide rings facing each other, with depressions for a flange of the shaft.

For optimum starting and stopping characteristics of the motors, the motor-side clutch half may preferably be provided with a steel ring as flywheel mass by means of gluing or heat shrinking.

The motor-side clutch half may also at one end have a recess for an integral projection of the steel ring and, at the other end, at least one recess segment to receive a deformable projecting part of the steel ring. The recess and deformable projection form an annular stop.

The steel ring has an annular groove next to the deformable projection. The remaining border next to the annular groove is easily pressed during assembly into the recess segments, of which preferably six are distributed over the circumference. When pressing the projections, special attention must be paid to have these firmly adhere to the ends of the recess segments, thus preventing any relative movements between the steel ring and the clutch half.

The bumpers mentioned initially may also be connected by means of bridges of material. These may form a closed inner and/or outer ring of elasticly deformable material, being joined to the bumper elements in such a way that their rolling movements result in bending deformations of the bridge. The bridge ring may be connected to the bumper elements by means of essentially non-rotational pins. In the devolution of the bumper elements torsion is transmitted directly or via the pins to the deformable bridge ring which is of sufficient length between the individual pins absorb the deformation.

According to other details of the invention, the bridge ring may have cross sectional taperings between the bumper elements and may be waveshaped or shaped in another way. The cross sectional taperings facilitate a very easy distorsion of the absorbing elements, and the wave-shape of the ring permits a compensation in length for its bending. The pins may at the ends be provided with transitional roundings to the bumpers elements and the deformable bridge ring for perfect transmission of the rotary movement from the bumper elements to the ring.

Assembly is made especially easy if an inner ring is used if the bumper elements are spherically rounded at the outer ends. The rounding facilitates an easy insertion of the complete bumper element into the retaining ring of a clutch half. Furthermore the friction moment between bumper element and contact surface of the retaining ring is reduced to a minimum, whereby the rotary movement of the bumper element is made easier compared to a design with flat ends. The material particularly suitable for these bumpers is Polyamid of 6.6 hardness.

Several examples of the invention are shown on the drawings and explained as follows:

DESCRIPTION OF PREFERRED EMBODIMENTS OF THE INVENTION

Figure 1:
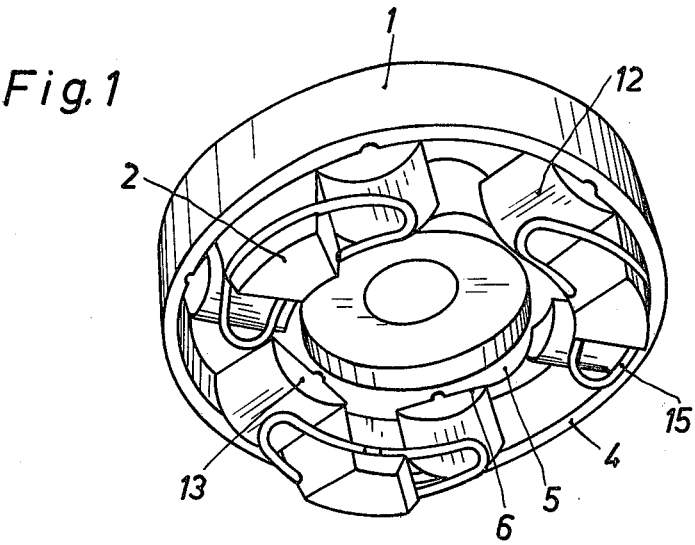
FIG. 1, both clutch halves in perspective.
Figure 1:
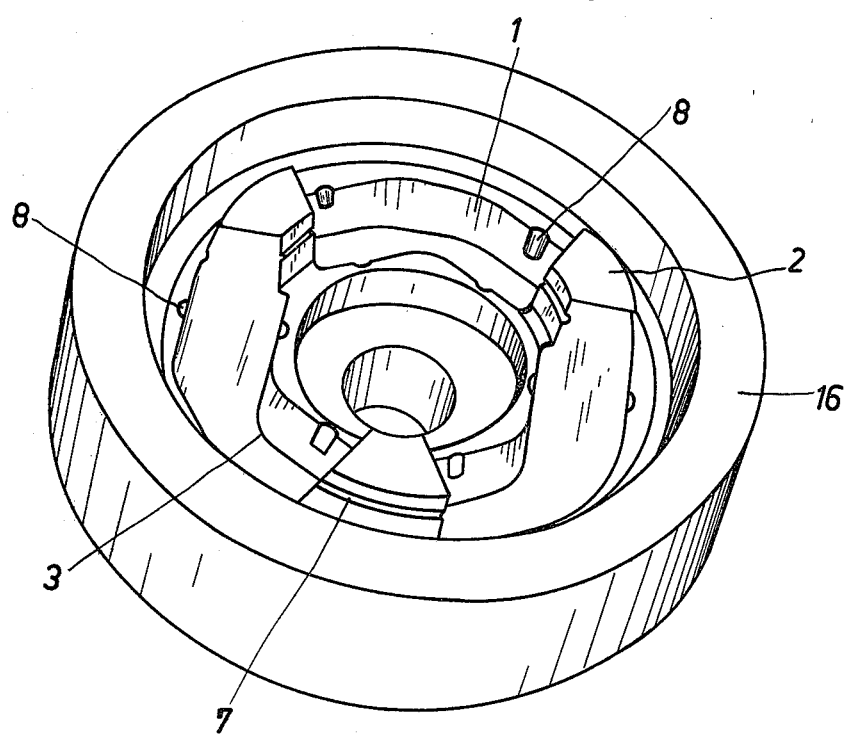
Figure 2:
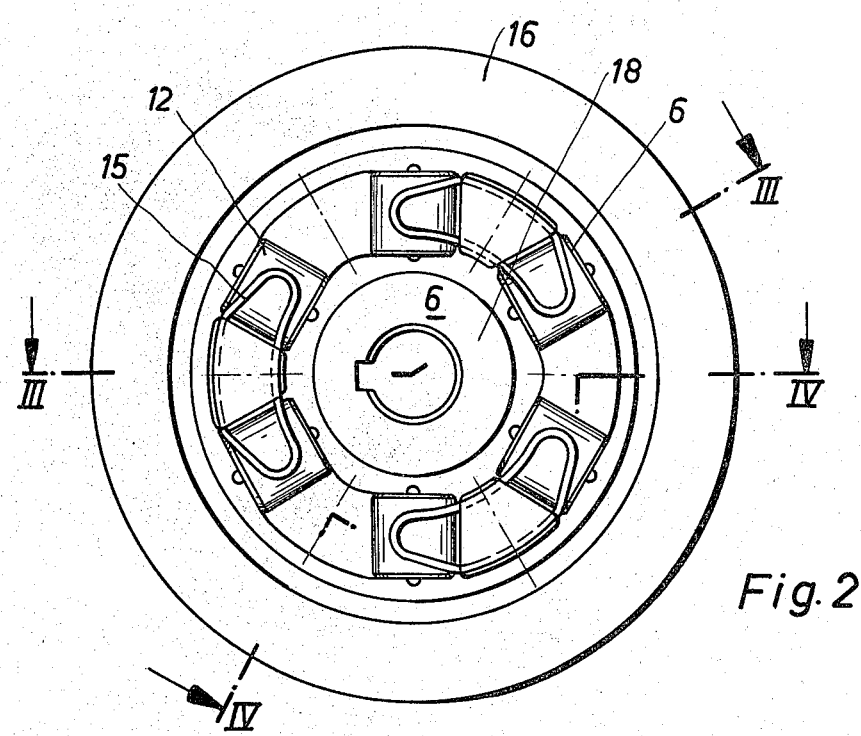
FIG. 2 is a front view of a motor-side clutch half with steel inertia ring.
Figure 3:
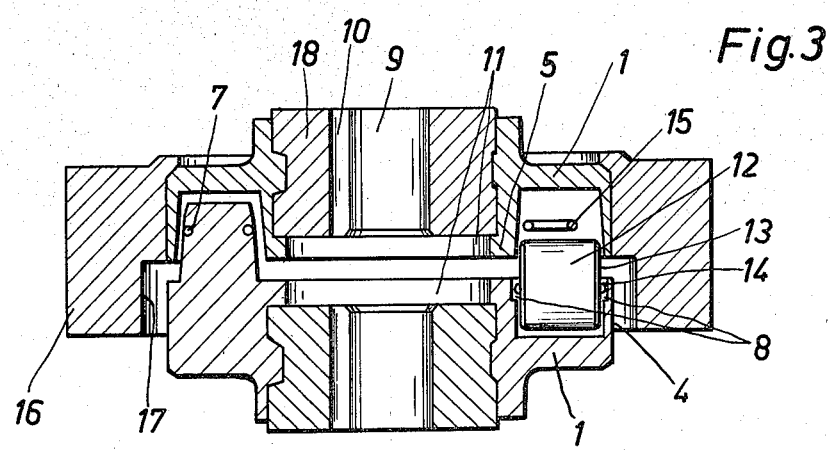
FIG. 3 is a cross section of both clutch halves according to section III—III in FIG. 2.
Figure 4:
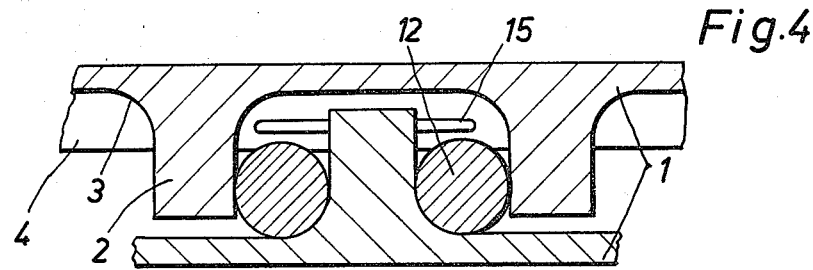
FIG. 4, is an enlarged fragmentary cross section IV—IV through FIG. 2.

FIG. 1 shows the disengaged clutch halves 1, one of them being provided with a heat-shrunk steel inertia ring 16 as flywheel mass. The clutch halves 1 are, as shown in FIG. 4, dovetailed via claws 2. The bottom of each clutch half 1 merges into claws 2 via roundings 3 (see FIG. 4) whose radius matches that of bumpers 12. Each clutch half 1 is provided with an outer retaining ring 4 and inner guide ring 5 with relatively flat faces 6. The cylindrical bumpers 12, with guide cams 14 projecting from front faces 13, are being arranged in between the flat surfaces, kept in guide grooves 8 of retaining ring 4 and guide ring 5. Each claw 2 has a recess 7 at the outer and inner border for receiving and retaining a spring lever 15 whose shape is shown in FIG. 2. FIGS. 3 and 4 show a distance between bumpers 12 and sring lever 15 indicating the provision of a clearance space.

Each of the clutch halves 1 is made of cast aluminum and has a central borehole 9 in a steel hub 18, with a spline groove 10 serving a non-rational connection to the respective shaft by means of adapter springs or the like. The aluminum clutch body is pressed around the steel hub, guaranteeing a perfect connection with the shafts not shown. The heat-shrunk steel ring 16, serving as a mass for one clutch half, is provided with an inner annular recess 17 to receive the other clutch half.

Figure 5:
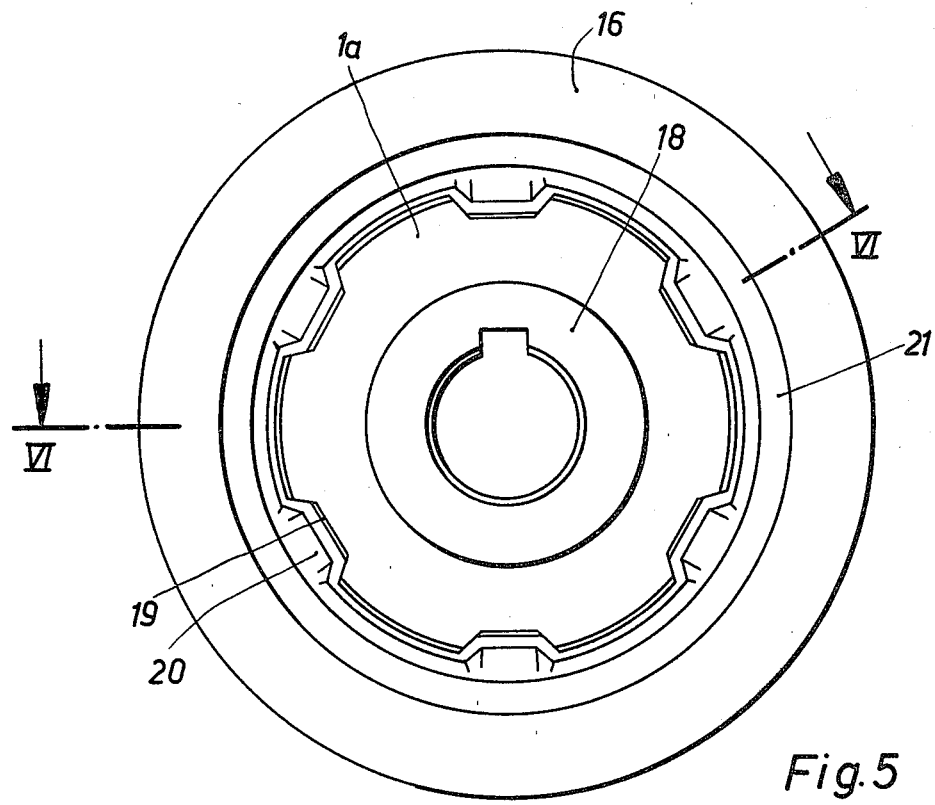
FIG. 5, front view of another clutch.
Figure 6:
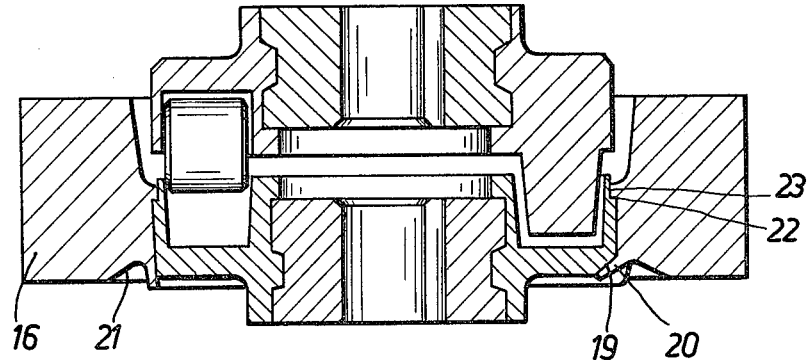
FIG. 6, cross section taken on lines VI—VI of FIG. 5.

FIGS. 5 and 6 show clutch half 1a provided with steel ring 16, with six recess segments 19 distributed over its circumference, into which deformable projections 20 of the steel ring 16 are pressed. In order to facilitate such pressing, the steel ring 16 is provided with an annular groove 21 at a distance of about 2 mm from the inner borehole receiving the clutch half 1a. The latter is provided, on the side opposite recess segments 19, with a shoulder 22 by which steel ring 16 is positioned in the recess 23.

Figure 7:
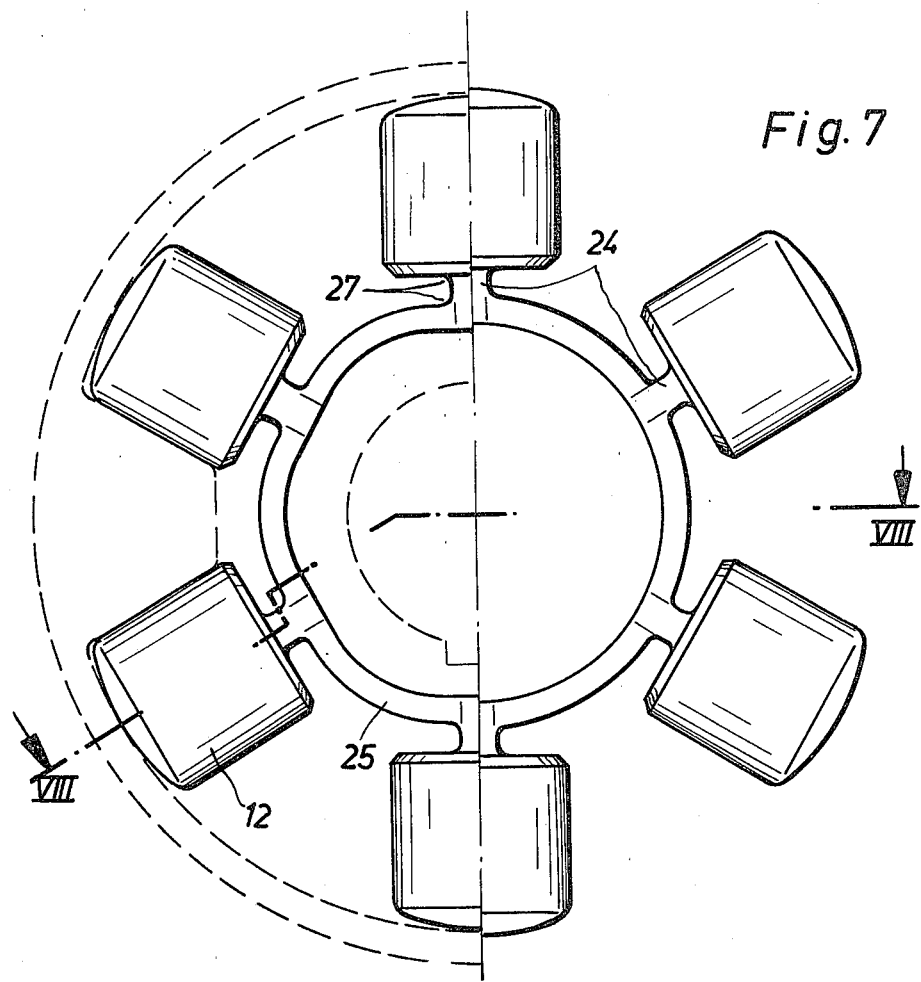
FIG. 7 shows a bridge ring with bumpers in plan view.
Figure 8:
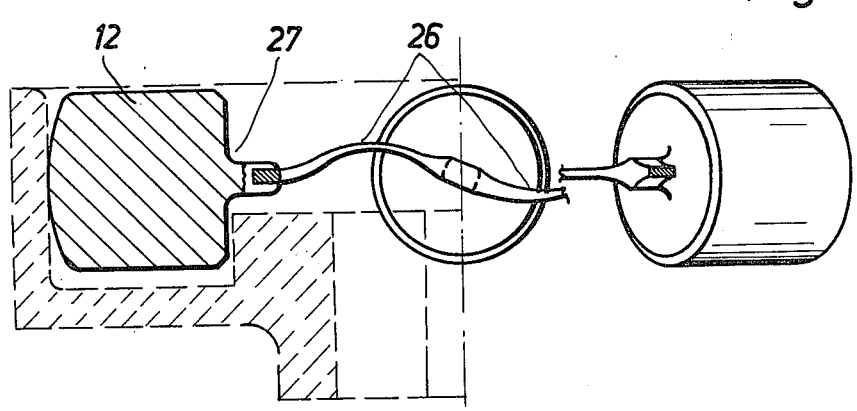
FIG. 8, is a cross section taken on line VIII—VIII of FIG. 7.

FIG. 7 shows the radially arranged bumpers 12 (incorporated into the clutch half on the left side) with pin 24 to ring 25. In the area between bumpers 12, the ring 25 may have the cross sectional tapering 26 shown in FIG. 8, permitting a very easy bending of ring 25 and thereby easy torsion of bumpers 12. In order to prevent stress peaks in the transmission of the torque through pins 24, the latter are provided with transitional roundings 27 to ring 25 and to bumpers 12. The bumpers 12 are spherical at the ends facing outward at 28 and are furthermore rounded off in order to permit easy insertion into a retaining ring, indicated in broken lines, of one clutch half.

Reference should be made to the following appended claims in determining the full scope of the invention.

We claim:

1. In a claw clutch of the type having opposed clutch halves, each having angularly distributed, axially projecting claws, and generally cylindrical elastic bumpers positioned between adjacent claws of the respective clutch halves, the improvement characterized by
   (a) said clutch halves being formed of die-cast aluminum,
   (b) the base areas of the respective claws being of rounded contour generally corresponding to the cylindrical contours of said elastic bumpers; and
   (c) said clutch halves include an outer retaining ring and an inner guide ring connecting said claws and confining said elastic bumpers therebetween, said claws projecting beyond said outer retaining ring and inner guide ring.

2. A claw clutch according to claim 1, further characterized by
   (a) said guide ring and retaining ring of each clutch half being formed with a plurality of opposed flat surfaces distributed at positions corresponding to the positions of said bumpers and engageable with the end faces of said bumpers.

3. A claw clutch according to claim 2, further characterized by
   (a) said bumpers comprising generally cylindrical rollers whose axes form a stellar arrangement around the clutch axis.

4. A claw clutch according to claim 3, further characterized by
   (a) said bumpers being, coaxial with their longitudinal axes, provided with guide element cams projecting from their end faces,
   (b) said retaining ring and guide ring being provided with guide grooves for the reception of said projecting guide elements.

5. A claw clutch according to claim 1, further characterized by
   (a) the claws of at least one clutch half being provided with recesses extending circumferentially, and
   (b) spring levers carried in said recesses for retaining said elastic bumpers.

6. A claw clutch according to claim 5, further characterized by
   (a) said spring levers being positioned at a distance from said bumpers to accommodate limited movements of the bumpers in a direction axial of said clutch halves.

7. A claw clutch according to claim 6, further characterized by
   (a) said spring levers being generally crescent shaped, and one being mounted on each claw of a clutch half, and
   (b) portions of said levers project circumferentially on each side of a claw over the bumpers located adjacent thereto.

8. A claw clutch according to claim 7, further characterized by (a) each spring lever being interrupted in the center region of one of the long sides thereof.

9. A claw clutch according to claim 1, further characterized by
   (a) said clutch halves being provided with recesses for receiving a flange of a shaft,
   (b) said recesses being located on the sides of the inner guide rings facing each other.

10. A claw clutch according to claim 1, further characterized by
    (a) a steel inertia ring being attached to at least one clutch half on a cylindrical shell surface.

11. A claw clutch according to claim 10, further characterized by
    (a) said cylindrical shell surface being provided at one end with a recess and at the other end with at least one recess segment, and
    (b) said steel ring having an annular flange at one end for reception in said recess, and a bendable projection at the other end adapted to be pressed into said recess segment.

12. A claw clutch according to claim 11, further characterized by
    (a) said steel ring being provided with an annular groove adjacent to said bendable projection.

13. A claw clutch according to claim 11, further characterized by
    (a) six recess segments and bendable projections being distributed over the circumference of said shell surface and steel ring.

14. A claw clutch according to claim 1, further characterized by
    (a) said elastic bumpers being connected to each other by means of a distortable bridge.

15. A claw clutch according to claim 14, further characterized by
    (a) said distortable bridge being in the form of a closed ring of elastically deformable material, with which the bumpers are joined so that their devolutions cause bending deformation of the ring.

16. A claw clutch according to claim 15, further characterized by
    (a) said deformable ring being joined in substantially nonrotational fashion with the elastic bumpers.

17. A claw clutch according to claim 15, further characterized by
    (a) said elastic bumpers being joined to the deformable ring by means of integral connecting pins extending coaxially from said bumpers.

18. A claw clutch according to claim 17, further characterized by
    (a) said connecting pins being provided at their ends with transitional roundings to the bumpers and/or the deformable bridge ring.

19. A claw clutch according to claim 17 further characterized by
    (a) said bridge ring and said connecting pins being connected to the radially inner ends of said bumpers, and
    (b) the outer ends of said bumpers being rounded off.

20. A claw clutch according to claim 17, further characterized by
    (a) said elastic bumpers, the connecting pins and the bridge ring being made of Polyamid of about 6.6 hardness.

21. A claw clutch according to claim 15, further characterized by
    (a) said deformable ring having a tapered cross section between adjacent bumpers.

22. A claw clutch according to claim 15, further characterized by
    (a) said deformable bridge ring being generally wave-shaped.

* * * * *